United States Patent [19]
Lucero et al.

[11] 3,764,223
[45] Oct. 9, 1973

[54] METHOD FOR LOCATING AND REMOVING MANHOLE COVERS

[75] Inventors: Frank J. Lucero; Jack A. Lucero, both of Denver; Gary R. Weekly, Littleton, all of Colo.

[73] Assignee: Lee Way Trenching, Inc., Denver, Colo.

[22] Filed: Feb. 18, 1971

[21] Appl. No.: 116,567

[52] U.S. Cl. ..................... 404/79, 324/3
[51] Int. Cl. ......................... E01c 23/14
[58] Field of Search ............. 94/34, 22; 137/369; 324/3, 41, 67

[56] References Cited
UNITED STATES PATENTS

| | | | |
|---|---|---|---|
| 2,856,580 | 10/1958 | Clark | 324/67 X |
| 3,492,564 | 1/1970 | Baker | 324/41 X |
| 1,950,169 | 3/1934 | Farasay | 94/1.5 |
| 3,250,190 | 5/1966 | Taylor | 94/34 |
| 3,601,691 | 8/1971 | Gardiner | 324/3 |
| 3,549,985 | 12/1970 | Penland | 324/3 |
| 3,355,658 | 11/1967 | Gardiner | 324/3 |
| 2,931,383 | 4/1960 | Handley | 324/3 X |

FOREIGN PATENTS OR APPLICATIONS 508,347  9/1930  Germany ..................... 324/67

*Primary Examiner*—Nile C. Byers, Jr.
*Attorney*—Reilly & Lewis

[57] ABSTRACT

The presence of a manhole cover in a roadbed under a layer of non-magnetic asphalt is detected and accurately located by a method in which magnetic detection apparatus have a detection alarm and employing inductive search coils is operative to sense the proximity of a metallic object, at least portions of which are magnetically detectable, through changes in coil inductance. The detectiom method and apparatus is capable of determining the thickness of the asphalt layer and heat is employed to efficiently melt through the asphalt in such a way as to permit removal of the cover without unnecessarily damaging the asphalt surface. Thereafter, the cover may be replaced in the road bed and resealed in place.

7 Claims, 6 Drawing Figures

PATENTED OCT 9 1973 3,764,223

INVENTORS
FRANK J. LUCERO
JACK A. LUCERO
GARY R. WEEKLY
BY
Reilly and Lenz
ATTORNEYS

METHOD FOR LOCATING AND REMOVING MANHOLE COVERS

The present invention relates to locating metallic objects and more particularly to a novel method of accurately determining the location and dimension of an imbedded object, such as, a metallic manhole cover covered over by asphalt, removing same, and replacing it, and also to novel apparatus for accurately locating the object.

Manholes are customarily imbedded in roads or streets to provide a means of access to the underground passageways formed beneath the streets. Such underground passages are used to contain gas lines, water mains, conduct sewage, etc. These manholes when not in use are generally closed by metallic manhole covers or lids of standardized shape and dimension.

In the maintenance of roads or streets, it is frequently necessary to coat the street with a smooth layer of asphalt or other road surfacing material in order to provide a smooth roadbed for vehicular travel. To avoid uneven areas in the asphalt coating and facilitate its application, the layer of asphalt is generally laid directly over the manhole. From time to time, it is necessary to reopen the concealed and imbedded manhole covers, for example, to check for the presence of explosive gas in the underground passageways or to check and repair the gas lines, water mains, etc., contained therein. The problem therefore is created of relocating the concealed manhole covers in a safe, accurate manner and of removing these covers to open the manholes without unnecessarily damaging the smooth asphalt surface covering the roadbed.

It is accordingly an object of the present invention to provide a novel method and apparatus for accurately locating the outer periphery of an imbedded object, such as, a manhole cover.

It is further an object of the present invention to provide a novel and improved method for accurately locating a concealed object, such as, a manhole cover, characterized by employing magnetic detector means.

It is additionally an object of the present invention to provide a novel method and means for locating a concealed magnetizable object, such as, an iron manhole cover, characterized by employing a relatively large inductive search coil or loop with electrical means to generally locate the magnetic object and employing a relatively small inductive search coil or loop with the same electrical means to accurately locate the outer periphery of the magnetic object.

It is also an object of the present invention to provide a novel method for removing a located object, such as, a manhole cover, covered by asphalt or the like characterized by melting through the asphalt around the periphery of the object so as to permit its removal.

It is another object of the present invention to provide a novel method for accurately locating an imbedded metallic object, such as, an iron manhole cover, determining the depth below surface at which it is located, as well as for removing same and replacing it.

It is still another object of the present invention to provide a novel method for locating, removing and replacing a magnetizable object, such as a manhole cover, covered over by asphalt or the like characterized by the steps of detecting the general location of the object, accurately locating the outer periphery of the object, determining the depth of the object below surface, melting through the asphalt around the periphery of the object so as to permit its removal without unnecessarily damaging the asphalt surface, and replacing the manhole cover in place once the subsurface operations have been performed.

It is still a further object of the present invention to provide a novel detecting apparatus for accurately locating the periphery of a magnetic object covered over by a non-magnetic layer of material.

In accomplishing the above and other objects, there is provided a novel method for accurately locating, exposing, removing and replacing an iron manhole cover in a roadbed which is covered over and concealed by a smooth continuous layer of asphalt. The manhole cover is initially located by use of a relatively large inductive search coil or loop around which current is driven by an electrical circuit. The electrical circuit includes alert means which are operated by the circuitry to indicate the presence of a magnetic object detected by a change in the loop inductance thereby to generally locate the manhole cover. A relatively small inductive loop or search coil is then used with the same electrical circuit to accurately locate the periphery of the cover and to determine the depth of the cover below the asphalt surface. A heating element is placed around the located periphery of the manhole cover and with the aid of an asbestos blanket the asphalt layer around the periphery of the cover is melted through. The cover is next removed after which the manhole is inspected and/or entered for the purpose desired. Thereafter the cover is replaced and the asphalt layer is repaired so that a smooth roadbed is formed.

The above and other objects, advantages and features of the present invention will become more readily appreciated and understood from a consideration of the following detailed description when taken with the accompanying drawings, in which.

Figure 1:
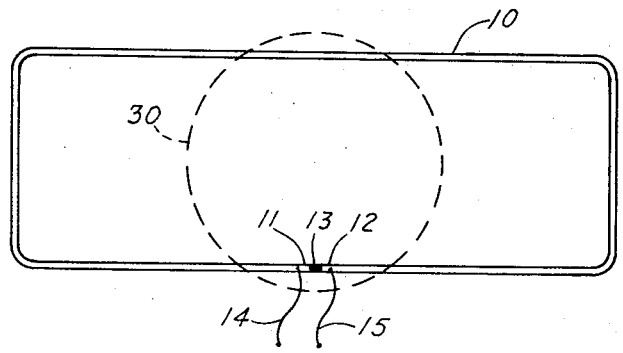
FIG. 1 is a plan view of a relatively large search coil suitable for use in the method of present invention for detecting the presence of a concealed manhole cover.

Referring to the drawings in more detail, there is shown in FIG. 1 an inductive search coil or loop 10. The coil 10 is employed in a manner hereinafter explained with suitable electrical circuitry to detect the presence of a magnetic mass, such as a concealed iron manhole cover, through changes in the coil's inductance. The coil 10 is constructed to have a longitudinal dimension which is several times longer than the diameter of a standard manhole cover so as to make the coil suitable for use in detecting the general location of a manhole cover. The coil 10 is shown positioned over a standard manhole cover 30 (shown in dashed lines) to illustrate the relative size of the coil 10 in comparison to the size of a standard manhole cover 30. The coil 10 preferably is formed in a substantially rectangular shape, although the coil could be formed in other suitable shapes, and has its ends 11 and 12 separated by an insulator 13 to provide electrical isolation therebetween. Electrical leads 14 and 15 are connected to the coil ends 11 and 12, respectively, to provide means for connecting the coil 10 to suitable electrical circuitry.

Figure 2:
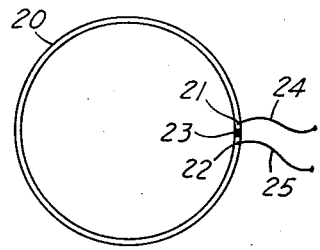
FIG. 2 is a plan view of a smaller search coil suitable for use in the method of the present invention for accurately locating the periphery of the concealed manhole cover.

Another inductive search coil or loop designated 20 is shown in FIG. 2. The coil 20 is substantially smaller than the coil 10 and is preferably circular in shape. The coil 20 preferably has a diameter slightly less than the radius of a standard manhole cover and is employed with suitable electrical circuitry in a manner hereinafter explained to accurately locate the outer peripheral edge of a concealed magnetic object, such as an iron manhole cover. The coil 20 has ends 21 and 22 which are physically separated by an insulator 23 and electrically isolated from one another. Electrical leads 24 and 25 are connected, respectively, to the coil ends 21 and 22 to provide means for connecting the coil 20 to suitable electrical circuitry. It is noted that the coil 20 may be formed in other suitable shapes and sizes, other than that illustrated in FIG. 2, as long as the coil 20 is suitably sized and shaped for use in accurately locating the outer edge of the concealed magnetic object to be located through changes in the coil's inductance.

Figure 3:
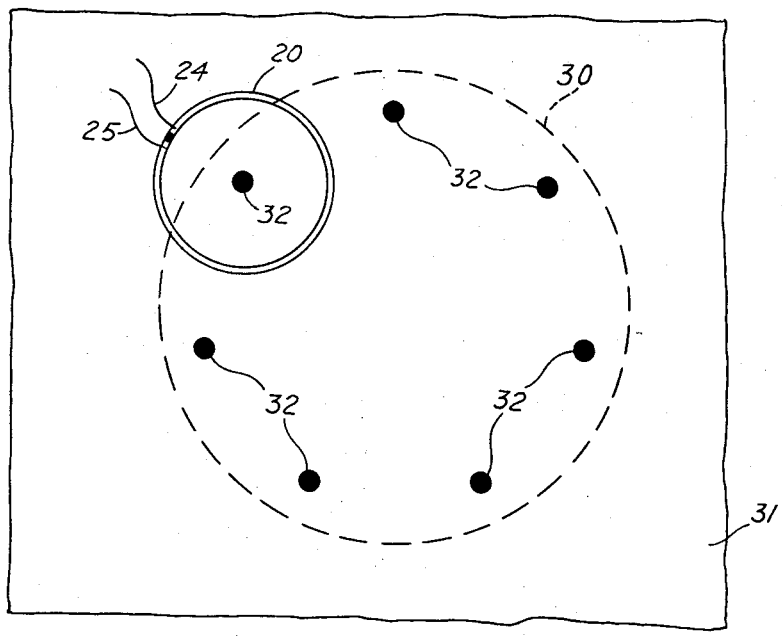
FIG. 3 illustrates the manner in which the search coil of FIG. 2 is employed to locate in a roadbed the periphery of an iron manhole cover which is covered over by a layer of asphalt.
Figure 4:
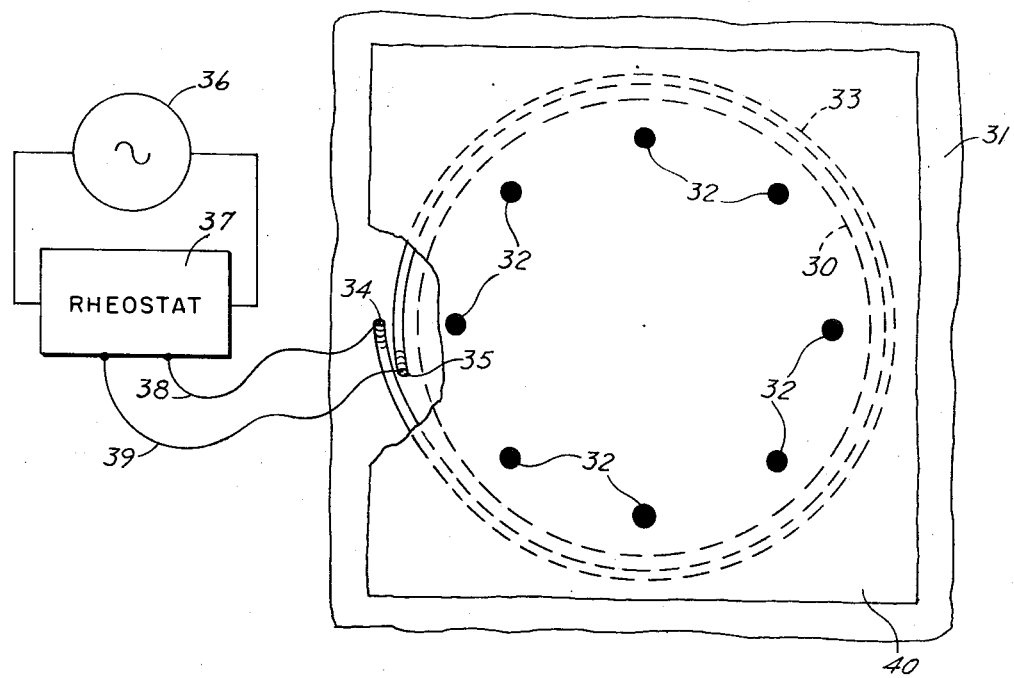
FIG. 4 illustrates the placement of a heating element covered over by an asbestos blanket for the purpose of melting through the asphalt layer around the located periphery of the manhole cover of FIG. 3 so as to permit the removal of the manhole cover in accordance with the present invention.

FIG. 3 shows a magnetizable manhole cover 30, conventionally composed of iron, located in a roadbed which is covered over by a layer or coating of a nonmagnetic road surfacing material 31, such as, asphalt. The coil 20 is shown in use for placing spots or marks 32, for example, by scoring the road surface, in order to accurately delineate the outer peripheral edge of the concealed manhole cover 30. The manner in which these spots 32 are located through use of the coil 20 is hereinafter explained. A heating element 33 which has an AC voltage applied across its ends 34 and 35 is shown in FIG. 4. The heating element 33 is formed to be substantially circular in shape and is dimensioned to correspond to and fit exactly around the outer periphery of a standard manhole cover 30. As shown in FIG. 4, the circular heating ring portion of the heating element 33 is positioned symmetrically around the outer edge of the manhole cover 30 and an asbestos blanket 40 is placed thereover for directing heat from the ring 33 unidirectionally downward into the asphalt layer 31. Voltage is supplied to the heating element 33 by an AC voltage source 36, which is preferably a 220 AC source, through a rheostat 37 for controlling the voltage applied to the ends 34 and 35 of the heating ring 33. Electrical leads 38 and 39 are connected from the output of the rheostat 37 to the element ends 34 and 35, respectively.

Figure 6:
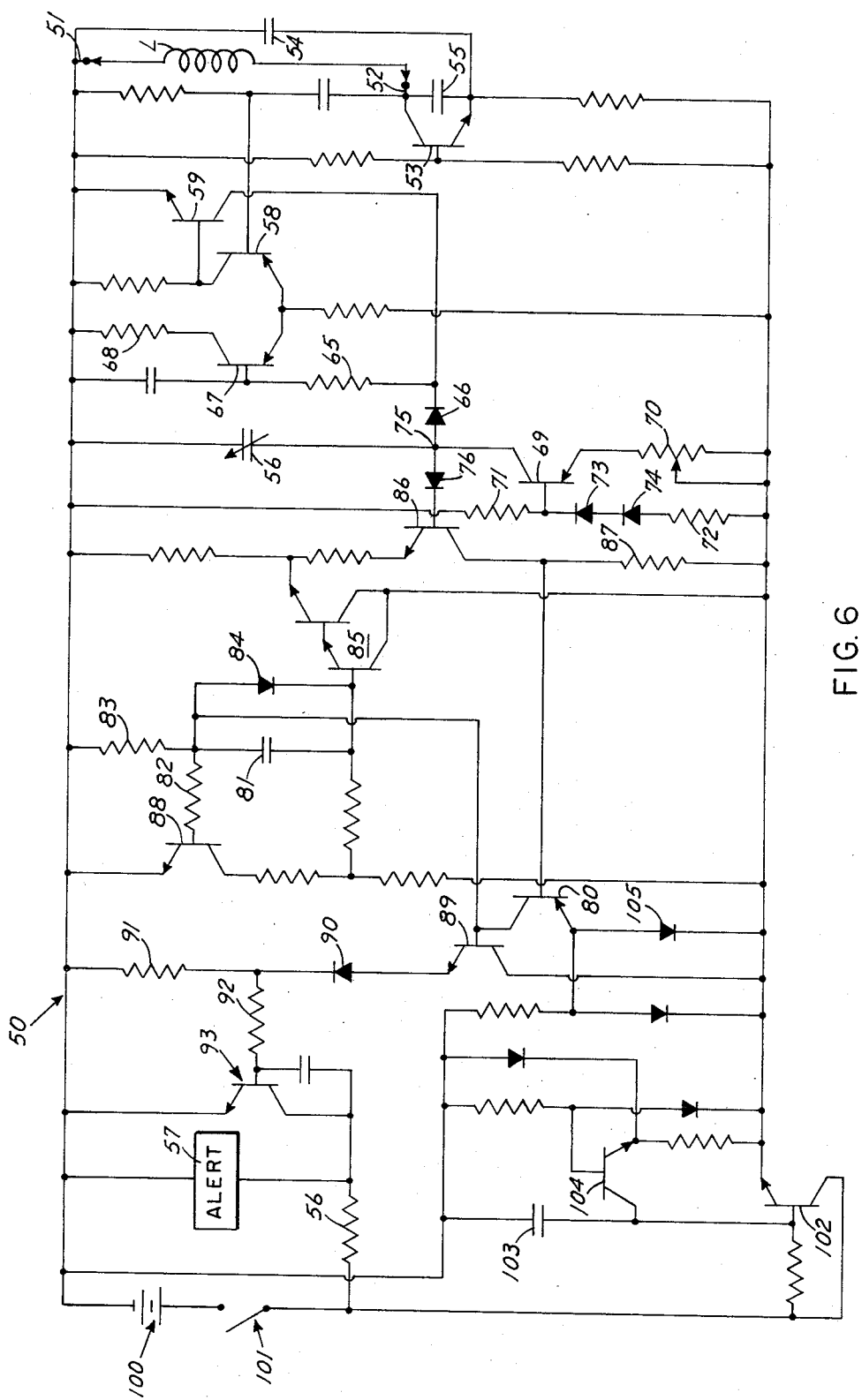
FIG. 6 is a schematic diagram of the electrical circuitry making up a magnetic or metal detection apparatus according to the present invention.

FIG. 6 shows one suitable circuit arrangement 50 which may be used with either the search coil 10 or 20 for generally or accurately locating, respectively, the manhole cover 30. In the circuit 50, a search coil L is shown connected at terminal 51 and 52, and either the inductive coil 10 or 20 may be used interchangeably as the coil L. The search coil L along with a transistor 53, capacitor 54 and capacitor 55 function as an oscillator and the oscillator is arranged so that its maximum amplitude of oscillation occurs when the search coil L is remotely positioned from any magnetic mass.

With the search coil L positioned remotely from any magnetic mass, feedback capacitor 56 is adjusted until the sonar alert or alarm 57, which is preferably a type of horn, is on the verge of sounding. Thus, when the search coil L senses a magnetic object and experiences an increase in its inductance as a function of the proximity and size of the magnetic mass, the sonar alert 57 will be activated by the operation of the circuit 50 to indicate that a magnetic mass has been detected.

In activating and deactivating the alarm 57, the circuit 50 functions to detect the location of a magnetic mass as follows: The transistor 53 along with the circuit formed by the coil L and capacitors 54-55 functions as an oscillator in which the output amplitude of its oscillations decrease as the inductance of the coil L increases. As a result, a negative-to-positive voltage drop appears across the resistor 65 which causes the base electrode of a transistor 67 to go positive so that the transistor 67 conducts and current flows through a sistor 68; and the output developed on the emitter electrode of the transistor 67 changes the biasing on the transistor 58 so that the oscillations across the transistor 53 are sustained.

The output signal developed by the transistor 59 appears on the cathode electrode of the diode 66. Through the action of a sensitivity network defined by transistor 69, resistors 70-72 and diodes 73-74, the point 75 becomes positive with respect to the cathode electrode of diode 76. At the same time, the output of a transistor 80 which functions as an amplifier and is applied to the junction of capacitor 81, resistors 82-83 and diode 84 drives a so-called Darlington transistor pair represented at 85. The output of the transistor pair 85 alters the potential on the emitter electrode of transistor 86 so that a control signal or voltage is developed across load resistor 87 which is a function of the position of the search coil L relative to a magnetic mass. The control signal on the resistor 87 is amplified by the transistor 80 so that a driver transistor 88 which has its base electrode connected to the resistor 82 drives the transistor pair 85 to conduct as a function of the search coil L's position relative to a magnetic mass.

The amplified output of the transistor 80 is applied to the base electrode of a transistor 89 and this output signal may be relatively positive or negative depending on the position of the search coil L relative to a magnetic mass. When the voltage applied to the base electrode of the transistor 89 is positive with respect to its emitter electrode, the transistor 89 conducts so that the anode of diode 90 becomes positive with respect to its cathode. Accordingly, a control voltage is generated across a resistor 91 and is transmitted to the base electrode of a transistor 93 through a resistor 92. The transistor 93 has its emitter-collector path connected to shunt the sonar alert 57 so that whenever the transistor 93 is turned on by the voltage applied to its base electrode the alert 57 is deactivated. Thus, the alert 57 is switched on and off as a function of the position of search coil L relative to magnetic mass. In the operation of the magnetic detection apparatus 50, the pitch of the sound generated by the alert 57 increases as the search coil L gets closer to magnetic objects due to the increase in the frequency of oscillations resulting from the increase in inductance of the search coil L.

It is noted in the circuit 50 that power is supplied by a battery 100 through its associated on-off switch 101 and that a transistor 102 is included which functions as a voltage regulator. A filter capacitor 103 is connected between the emitter electrode of the transistor 93 and the base electrode of the transistor 102. The control voltage applied to the base electrode of the transistor 93 functions to open and close the transistor switch 93 so as, respectively, to activate and deactivate the sonar alert 57. The transistor 104 in the circuit 50 also functions as a voltage regulator and through clamping diodes, in particular clamping diode 105, insures that a constant bias voltage is applied to the emitter electrode of the transistor 80.

In summary, the circuitry 50 functions in conjunction with coil L (which may be either the inductance coil 10 or 20) to detect the proximity of a magnetic object by being calibrated so that when a magnetic mass is not being sensed by the coil L the oscillator provided by the coil L, the transistor 53 and capacitors 54-55 oscillates at its maximum amplitude to reverse bias the transistor 58 and the circuit 50 will function to bias the transistor 93 into conduction to shunt and deactivate the sonar alert 57. As the search coil L is brought into close proximity of a magnetic mass, the inductance of the coil L increases to approach a value determined by the ratio of capacitors 54 and 55 so that the amplitude of the oscillator's oscillations decreases towards zero. As a result, an appropriate bias is applied to the base electrode of transistor 58 so that the circuit 50 functions to turn on and off the transistor switch 93 to control the activation of the alert 57 and control the pitch and intensity of the alert 57 as a function of the position of the search coil L relative to a magnetic mass.

The concealed iron manhole cover 30 of FIG. 3 which is a magnetic mass and which is concealed below a non-magnetic layer of asphalt 31 may be found, accurately located, removed and replaced by the following exemplary procedure which illustrates the preferred method of the present invention. The large inductive search coil 10 is first used by connecting its electrical leads 14 and 15 to the terminals 51 and 52 of the electrical circuit 50. The switch 101 of the circuit 50 is closed and the coil 10 advanced across the area of the roadbed in which the manhole cover 30 is known to be located. The circuit 50 and coil 10 are calibrated and designed for detecting a standard size iron manhole cover so that once the coil 10 is positioned substantially centrally over the cover 30 the inductance of the coil 10 increases to the predetermined level necessary for the alert 57 to be energized in the manner hereinbefore described. The position of the coil 10 at the instant the alarm energizes then indicates the general location of the cover 30. It is noted that this general location may be ascertained more accurately by moving the coil in all directions until the alert 57 is switched off by the operation of the circuit 50 to indicate that the coil 10 is no longer influenced to any significant extent by the cover 30. In this way, the approximate area covered by the concealed cover 30 may be ascertained.

The coil 10 is then disconnected from the circuitry 50 and the leads 24 and 25 of the smaller coil 20 are connected to the circuit terminals 51 and 52. The small coil 20 is placed over the general location of the cover 30 at a location at which the alert 57 is energized, moved radially to a point that the alert 57 is deenergized, and then moved back towards the location of the cover 30 until the alert 57 is first energized. A spot 32 is then marked in the center of the coil 20, as shown in FIG. 3, such as by scoring or with paint. A plurality of spots 32 are formed in this consistent manner thereby to form a circular pattern which is related to and outlines the location and shape of the outer edge of the cover 30. It is noted that since the thickness of the asphalt coating 31 covering the cover 30 may vary that the spots 32 may be marked closer to the center of the cover 30 in some instances than in others. This variation is due to the fact that the coil 20 along with the circuitry 50 operates to first energize the alert 57 as a function of the distance of the iron cover 30 from the coil 20. Therefore, the thinner the asphalt layer 31 the farther the spots 32 will be from the center of the cover 30.

The six spots 32 marked in the circular pattern shown in FIGS. 3 and 4 are shown falling within the outer edge of the cover 30. It is noted that since these spots 32 are all marked through the use of the same consistent method that all lie a constant distance from the center of the iron cover 30 and the center point of the cover 30 may be accurately located. Thus, regardless of whether the spots 32 marked fall outside of the periphery of the cover 30, exactly along its outer boundary or within the outer edge of the cover 30, the exact location of the outer edge of the cover 30 relative to the asphalt 31 may be determined by drawing a circle having the known radius of the standard sized cover 30 about the center of the circle defined by the spots 32.

To remove the cover 30, the heater ring 33 is placed concentrically around the spots 32 of FIGS. 3 and 4, thereby to be positioned just outside the outer edge of the cover 30 as shown in FIG. 4. It is noted that the heater ring 33 also provides a pattern for conveniently locating and delineating the outer edge of the cover 30 since it is dimensioned to be just slightly larger and of the same shape. The asbestos blanket 40 is next placed over the heating element 33 and a suitable weight, such as, a chain, is placed on the asbestos blanket adjacent the element 33 to secure the blanket in place. The coil 20 still connected to the circuitry 50 is then used to determine the approximate depth of the asphalt layer over the cover 30 by placing the coil 20 in the center of the element 33 and slowly raising it vertically until the alert 57 is turned off by the operation of the circuitry 50. The vertical height of the coil 20 over the asphalt 31 is measured to give an estimated depth of the asphalt coating since the alert 57 is switched off at a fixed distance from the cover 30 and this distance equals the sum of the asphalt thickness and the vertical height of the coil 20 over the asphalt 31. The heating element 33 is then energized by turning on the power supply 36 and the rheostat 37 is set to apply an appropriate voltage across the ends 34 and 35 of the heating element 33.

Depending upon the voltage applied to the heating element 33, which determines the rate that heat energy is generated and the estimated thickness of the layer of asphalt covering the cover 30, the heating element 33 is allowed to melt through the layer of asphalt for a selected period of time, usually from five to twenty minutes to detach the asphalt adhering to the cover 30 from the rest of the asphalt layer 31. The asbestos blanket 40 functions during this burning or melting step to prevent the undue loss of heat energy from the heating element 33 and concentrates its application to the selected section of the asphalt 31. It is here noted that the step of determining the estimated depth of the asphalt 31 by vertically raising the coil 20 until the alert 57 is switched off may be performed any time after a sufficient number of spots 32 are marked to determine the location of the portion of asphalt 31 situated over the center of the cover 30, such as, just prior to the positioning of the heating element 33 concentrically relative to the circle defined by the marks 32.

Figure 5:
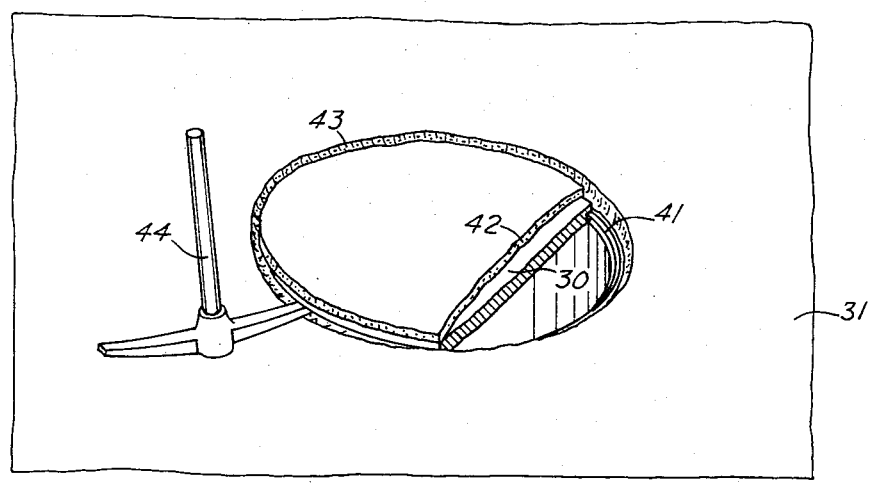
FIG. 5 is a partial cutaway view of the asphalt layer and manhole cover of FIG. 3 illustrating the use of a pick to remove the manhole cover after the asphalt layer around the manhole cover has been melted through by the heating element of FIG. 4.

Once the asphalt layer 31 has been melted through to cut the asphalt 47 on the cover 30 away from the rest of the asphalt layer 31 as is shown in FIG. 5 by the cut 43 through the asphalt layer 31 around the edge of the cover 30, the heating ring 33 is removed and a pick 44 or other implement may be used to pry up and remove the cover 30. With the manhole cover 30 removed, the manhole may be checked for explosive gas and entered or inspected as desired. For example, if water is found in the underground passageway associated with the manhole it will be pumped out or if explosive or toxic gas is found therein, fresh air will be forced into the manhole. Also, with the manhole cover 30 removed, the rim 41 of the manhole in which the cover 30 rests which is shown in FIG. 5 may be cleaned, painted and a conventional riser ring may be installed therein to raise the level of the manhole to that of the roadbed. The manhole cover 30 is then heated on its underside, such as by a blow torch, to soften the asphalt layer 42 thereon and detach it from the cover 30. The cover 30 is then replaced to close the manhole, and the crack between the cover 30 and the rim structure 41 in which it is mounted is filled, such as with asphalt, to seal the manhole. The asphalt while hot may be tamped and smoothed to insure that a smooth surface is provided around the manhole. With the manhole cover 30 replaced, the area around the cover 30 is then cleaned to remove the debris accumulated around the manhole during the above-described procedure of locating, removing and replacing the manhole cover 30.

In the foregoing there has been described a novel method for locating, removing and replacing a magnetizable object, or an object at least portions of which can be magnetically detected; i.e., an iron manhole cover in a roadbed, covered over by a layer of non-magnetic substance, such as asphalt, with minimal damage to the surface of the non-magnetic substance. Additionally, there has been provided novel apparatus for detecting such objects which includes an inductive search coil to sense a magnetic object as a function of the amount of magnetic mass in the object and its distance from the inductive coil. The inductive coil forms part of an oscillator circuit which decreases its amplitude of oscillations as the inductive coil increases in inductance due to the influence of the presence of a magnetic object. Different shapes and sizes of inductive search coils may be used which are particularly designed for generally or accurately locating the magnetic object. It is noted that exemplary circuitry 50 is arranged with an alert means which is normally not activated but which activates upon the detection of a magnetic object. The circuitry, however, could be arranged so that the alert 57 is normally activated and is deactivated upon detection of a magnetic object.

It is therefore to be understood from the foregoing description of a preferred form of the present invention that various modifications and changes may be made in the steps and order of steps in the method of the present invention and also in the specific design, construction and arrangement of circuitry and mechanism employed without departing from the spirit and scope of the present invention.

What is claimed is:

1. A method of accurately locating and removing a manhole cover of predetermined size and shape which is covered by a layer of asphalt comprising the steps of:
   sensing the general location of the manhole cover within the asphalt layer;
   magnetically detecting the outer peripheral edge of the cover and marking on the asphalt layer the outline shape of the outer peripheral edge of the cover;
   melting through the asphalt layer around the peripheral edge of the cover by covering the asphalt layer with an insulating material and applying heat to the layer beneath the insulating material around the peripheral edge of the cover so as to separate the asphalt on the cover from the rest of the asphalt layer; and
   removing the cover from the asphalt layer.

2. The method recited in claim 1 wherein the outer peripheral edge of the cover is magnetically detected by locating a plurality of marks relative to the outer peripheral edge of the cover through the use of a magnetic detection apparatus, and wherein the magnetic detection apparatus employed includes an inductive coil which changes inductance as a function of the proximity and mass of the cover, oscillator means including the coil which changes its amplitude of oscillation whenever the inductance of the coil increases due to the detection of the cover, and alert means operated by the oscillator means for indicating the detection of the cover.

3. The method recited in claim 2 wherein the marks are located by moving the inductive coil relative to the manhole cover so as to activate and deactivate the alert means and the marks are marked relative to the positioning of the coil in a consistent manner to establish the shape of the outer edge of the cover.

4. The method recited in claim 3 wherein the steps of magnetically detecting the approximate depth of the asphalt layer over the cover includes employing a heating element beneath the layer of insulating material to melt through the asphalt layer, and controlling the duration the heating element is energized and the rate it generates heat energy according to the thickness of the asphalt layer.

5. The method recited in claim 4, wherein the depth of the asphalt layer is determined by moving the coil of the magnetic detection apparatus upward vertically from the portion of asphalt situated over the located center of the cover to the position where the inductance of the coil decreases to the value at which the alert means is deactivated by the oscillator means, and the insulating material is an asbestos blanket which is secured over the heating element during its energization to prevent the loss of heat energy and direct the heat generated into the asphalt.

6. The method recited in claim 5 wherein the general location of the manhole cover is magnetically sensed.

7. The method recited in claim 6, including the step of replacing and resealing the removed manhole cover in place.

* * * * *

PO-1050
(5/69)

UNITED STATES PATENT OFFICE
CERTIFICATE OF CORRECTION

Patent No. 3,764,223            Dated 9 October 1973

Inventor(s) Frank J. Lucero, Jack A. Lucero, Gary R. Weekly

It is certified that error appears in the above-identified patent and that said Letters Patent are hereby corrected as shown below:

In the Abstract:

Line 8, cancel "detectiom" and substitute -- detection --

In the Technical Disclosure:

Column 2, line 15, cancel "around" and substitute -- through -

Signed and sealed this 21st day of May 1974.

(SEAL)
Attest:

EDWARD M. FLETCHER, JR.            C. MARSHALL DANN
Attesting Officer                  Commissioner of Patents